(12) United States Patent
Sano et al.

(10) Patent No.: US 7,103,833 B1
(45) Date of Patent: Sep. 5, 2006

(54) IMAGE PROCESSING APPARATUS, OUTPUT APPARATUS, IMAGE PROCESSING SYSTEM AND IMAGE PROCESSING METHOD

(75) Inventors: Makoto Sano, Ebina (JP); Masaya Miyazaki, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 511 days.

(21) Appl. No.: 09/215,555

(22) Filed: Dec. 18, 1998

(30) Foreign Application Priority Data

Jan. 12, 1998 (JP) ................................. 10-004320

(51) Int. Cl.
*G06F 15/00* (2006.01)

(52) U.S. Cl. ...................... 715/501.1; 715/502; 707/10

(58) Field of Classification Search ................. 707/10; 345/501; 358/1.15; 715/501.1, 502
See application file for complete search history.

(56) References Cited

U.S. PATENT DOCUMENTS

| | | | | |
|---|---|---|---|---|
| 5,577,173 A | * | 11/1996 | Dennis et al. ............. | 345/530 |
| 5,588,095 A | * | 12/1996 | Dennis et al. ............. | 358/1.16 |
| 5,604,847 A | * | 2/1997 | Dennis et al. ............. | 345/530 |
| 5,805,174 A | * | 9/1998 | Ramchandran ............. | 345/501 |
| 5,825,994 A | * | 10/1998 | Kumada .................... | 358/1.17 |
| 5,859,956 A | * | 1/1999 | Sugiyama et al. ......... | 358/1.13 |
| 6,006,013 A | * | 12/1999 | Rumph et al. ............. | 358/1.15 |

FOREIGN PATENT DOCUMENTS

| | | |
|---|---|---|
| JP | 63-64474 A | 3/1988 |
| JP | 5-189575 A | 7/1993 |
| JP | 6-195182 A | 7/1994 |
| JP | A-6-195182 | 7/1994 |
| JP | 7-232456 A | 9/1995 |
| JP | 9-6552 A | 1/1997 |
| JP | 9-30070 A | 2/1997 |
| JP | A-9-58069 | 3/1997 |
| JP | 9-147093 A | 6/1997 |
| JP | 9-330187 A | 12/1997 |
| JP | 11-10965 A | 1/1999 |
| JP | 11-95946 A | 4/1999 |

* cited by examiner

Primary Examiner—Heather R. Herndon
Assistant Examiner—R. Singh
(74) Attorney, Agent, or Firm—Oliff & Berridge, PLC

(57) ABSTRACT

When print data PD generated by applications 100 is supplied to a graphics library 110 in an order of describing objects, the graphics library 110 makes correspond print data PD to objects so as to store print data PD in a metafile 120. After print data for one page has been stored in the metafile 120, the metafile 120 is retrieved. Thus, print data PD is reconstructed for each band. A printer driver 130 converts reconstructed print data PD into the PDL data PD' so as to transfer the PDL data PD' to an output apparatus 2. A decomposer 140 does not generate intermediate format data and directly develops the PDL data PD' in a band buffer 22. An output device 24 reads raster data RD from the band buffer 22 so as to print an image on a paper sheet.

14 Claims, 12 Drawing Sheets

IMAGE PROCESSING APPARATUS, OUTPUT APPARATUS, IMAGE PROCESSING SYSTEM AND IMAGE PROCESSING METHOD

BACKGROUND OF THE INVENTION

The present invention relates to an image processing apparatus, an output apparatus, an image processing system and an image processing method arranged to perform a banding process such that a process for dividing objects across bands is performed so that an image is directly drawn on a band buffer without a necessity of generating an intermediate language.

An output apparatus for interpreting print data supplied from a host side application to produces an output of an image on a printing sheet or the like generally incorporates a work memory required to convert print data into a raster scan type format and a memory to serve as an output buffer for storing converted raster data. In particular, the output buffer must have a large memory capacity because raster data obtained by raster development must be stored. Therefore, a major portion of the output apparatuses is structured to perform a process for dividing one page in a sub-scanning direction into a plurality of regions which are called bands. Moreover, raster data is generated for each band. The foregoing process for reconstructing print data in band units is called a banding process which is well known.

The above-mentioned conventional image processing systems required to reduce the memory capacity of the output buffer have been adapted to the following method.

For example, an image processing system is known in which PDL data is converted into intermediate format data by an output apparatus, followed by developing intermediate format data into raster data on the output buffer. In the foregoing case, the capacity of the output buffer can be reduced because the raster development can be performed in band units.

Another image processing system is known which has the steps of causing a host-side apparatus to generate raster data for each band and causing an output apparatus to store raster data in band units. Also an image processing system is known in which intermediate format data for each band is generated by the host-side apparatus. Moreover, the output apparatus raster-develops intermediate format data. Also in the above-mentioned cases, raster data can be generated in band units so that the reduction in the capacity of the output buffer is permitted.

However, the image processing system, which has the structure that the host-side apparatus generates PDL data and the output apparatus generates intermediate format data so that the banding process is performed, cannot reduce the load which must be borne by the output apparatus. Therefore, there arises a problem in that long waiting time is required until a printing process is completed if a plurality of host apparatuses simultaneously make demands to perform printing operations. If PDL data relates to an image, the foregoing system is required to convert image data into an intermediate code and to store original image data until original image data is raster-developed. The data capacity of image data is considerably larger as compared with text data and graphics data. Therefore, image data is usually compressed when it is stored. Another problem arises in that a memory must be provided which temporarily stores image data in order to perform the compressing process.

The system structured to cause the host-side apparatus to perform the banding process to generate raster data and the system causing the host-side apparatus to perform the banding process to generate intermediate format data cannot reduce the load which must be borne by the host-side apparatus. Therefore, there arises a problem in that long waiting time is required to receive a next instruction from input of a print command to the host-side apparatus.

A portion of the output apparatuses incorporates individual trays for the portrait direction and the landscape direction even if the sizes of the printing sheets are the same. In a case where the foregoing output apparatus encounters a case in which either of the trays has no paper sheet, it is convenient if paper sheets in another tray can be used to continue the printing operation. However, since the band is formed by dividing one page in the sub-scanning direction, the printing process cannot be performed by using the paper sheets in the other tray if the banding process is performed by the host-side apparatus.

SUMMARY OF THE INVENTION

In view of the foregoing, an object of the present invention is to provide an image processing system which is capable of reducing the capacity of a memory and improving a print quality and which can easily be used.

An image processing apparatus which is capable of solving the problems and according to the present invention comprises: a reconstructing means for reconstructing print data for instructing the contents of objects positioned in one page in band units obtained by dividing the page into a plurality of regions; converting means for converting data reconstructed by the reconstructing means into PDL data in a page description language form; and transmitting means for transmitting PDL data.

An output apparatus for use together with the foregoing image processing apparatus comprises: receiving means for receiving PDL data; raster converting means for converting PDL data received by the receiving means into raster data; a buffer for storing, in band units, raster data converted by the raster converting means; and a printing mechanism for printing the objects on a printing sheet in accordance with raster data read from the buffer.

DETAILED DESCRIPTION OF THE PREFERRED EMBODIMENTS

First Embodiment

1. Overall Structure

Figure 1:
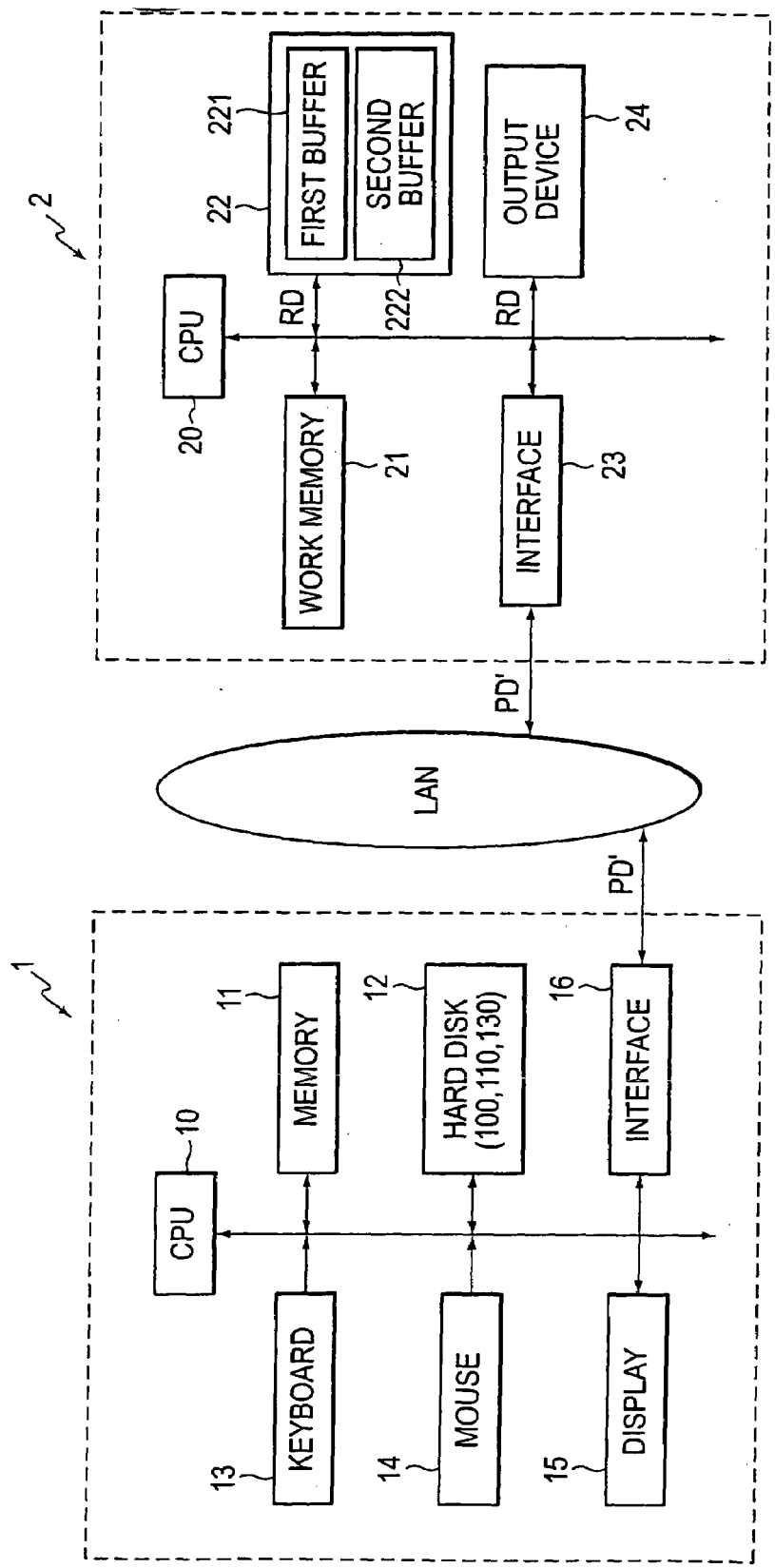
FIG. 1 is a block diagram showing an image processing system according to a first embodiment.

The overall structure of an image processing system according to a first embodiment of the present invention will now be described. FIG. 1 is a block diagram showing the image processing system according to this embodiment. As shown in the drawing, the image processing system incorporates a host computer 1, an output apparatus 2 and local area network LAN.

The host computer 1 incorporates a CPU (Central Processing Unit) 10 for controlling the elements of the host-side apparatus, a memory 11 serving as a working memory for the CPU 10, a hard disk 12 for storing large-capacity data and various programs, a keyboard 13 and a mouse 14 serving as input devices, a display unit 15 for displaying an image and an interface 16 for establishing the communication with the local area network LAN.

In the hard disk 12, there are stored a variety of applications 100 for use in the image process and a printing program for printing print data PD generated by the foregoing applications. When a user operates the keyboard 13 or the mouse 14, the applications 100 are read from the hard disk 12 so as to be supplied to the memory 11. Thus, the image process is executed. An image generated by the applications 100 is displayed on a display unit 16 so that the user is permitted to modify the image while observing the display unit 16. Elements of the image which is generated by the applications 100 are called objects.

When the user operates the keyboard 13 or the mouse 14 to input a print command, the printing program is turned on. The printing program is composed of a graphics library 110 and a printer driver 130 to be described later. Thus, PDL data PD' obtained by converting print data PD into a command string in the form of a page description language (PDL) is generated in band units. The interface 16 transfers PDL data PD' to the output apparatus 2 through the local area network LAN.

The output apparatus 2 incorporates a CPU 20 for controlling the elements of the apparatus, a work memory 21 for providing a working area for the CPU 20, a band buffer 22 in which data is stored in band units, an interface 23 for establishing the communication with the local area network LAN and an output device (a printing mechanism) 24. In the above-mentioned structure, PDL data PD' is transferred to the output apparatus 2 through the local area network LAN. Thus, the interface 23 conducts the communication with the local area network LAN so as to transfer PDL data PD' to the CPU 20. The CPU 20 interprets the command string of PDL data PD' so as to generate raster data RD in band units. The CPU 20 stores the raster data RD in the band buffer 22. The band buffer 22 is composed of a first buffer 221 and a second buffer 222. When raster data RD is being written on either of the buffers, raster data RD is read from another buffer. Thus, the band buffer 22 is structured such that writing and reading are alternately performed. A rate for reading raster data RD from the band buffer 22 is controlled by the CPU 20 so as to be in synchronization with the printing operation which is performed by the output device 24.

2. Functional Structure

The functional structure of the image processing system according to the first embodiment will now be described.

Figure 2:
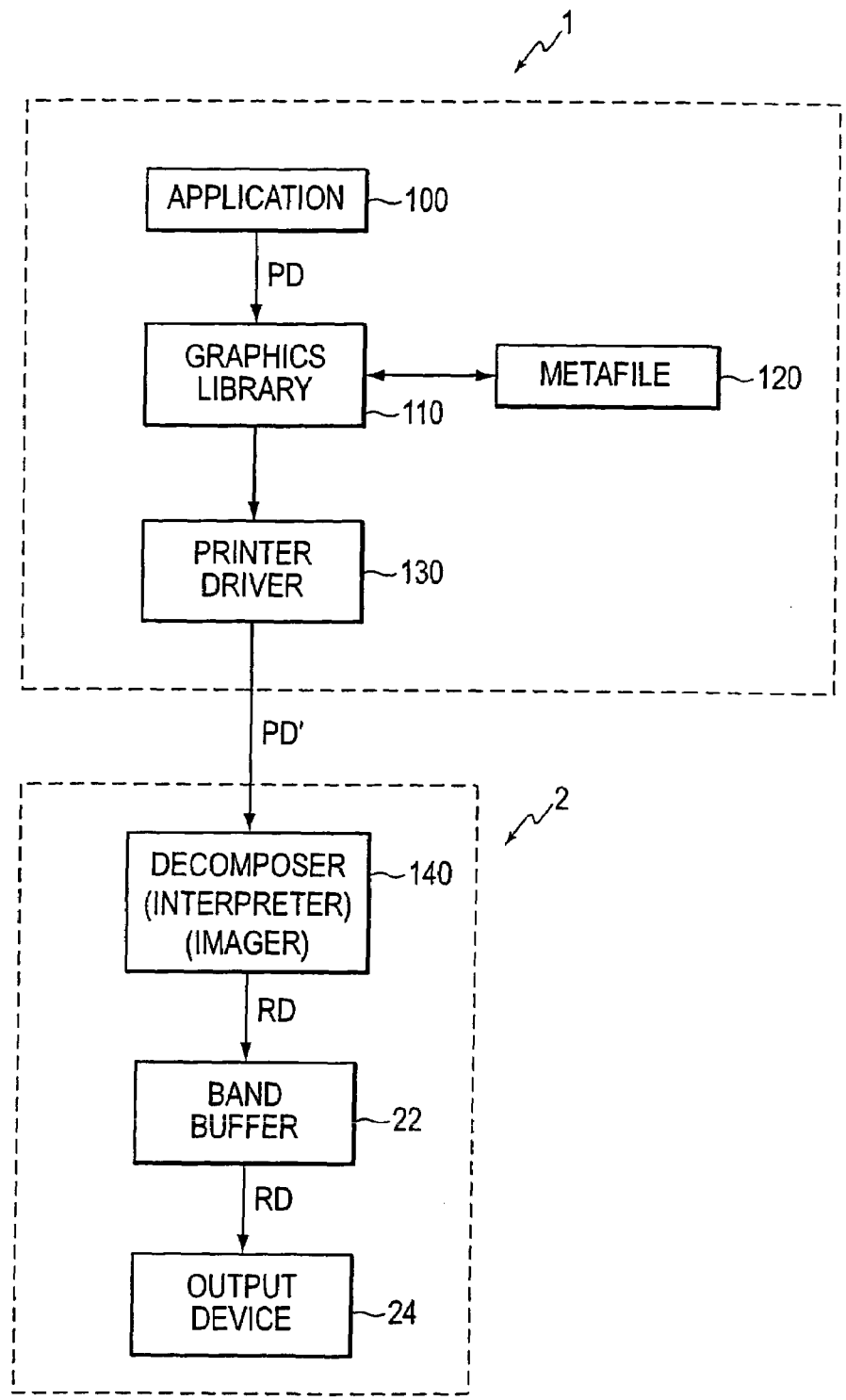
FIG. 2 is a block diagram showing the functional structure of the image processing system according to the embodiment.

FIG. 2 is a block diagram of the image processing system according to the first embodiment. In the host computer 1, the applications 100 generate print data PD for each page. In the foregoing case, print data PD is not always generated in the order of scanning the pages. Print data PD is generated in object units. That is, print data PD is generated in the order of describing the objects positioned at arbitrary positions in one page.

The graphics library 110 comprises a so-called GDI (Graphic Devising Interface) to transfer print data PD to the printer driver 130 in band units. Since print data PD is generated in the order of describing the objects, transference of print data for one page to the printer driver 130 is inhibited if generation of print data PD for one page is not completed. Therefore, this embodiment incorporates a metafile 120 in which print data PD for one page made to correspond to the objects is stored. When the graphics library 110 has written print data PD for one page on the metafile 120, the graphics library 110 retrieves the metafile 120 in a predetermined order of the bands. Then, the graphics library 110 reconstructs print data PD in band units so as to transmit print data PD to the printer driver 130.

Then, the printer driver 130 converts print data PD reconstructed in band units into PDL data PD' so as to transmit PDL data PD' to the output apparatus 2.

A decomposer 140 of the output apparatus 2 interprets PDL data PD' supplied from the host computer 1 by an interpreter thereof. The interpreter calls a processing module corresponding to the type of the command indicated with PDL data PD'. Specifically, when data is graphic data indicating lines or graphics, a graphic processing module is called. When data is image data indicating a photograph or the like, an image processing module is called. When data is text data, a text processing module is called. An imager for converting PDL data PD' into raster data RD is composed of the above-mentioned processing modules. The foregoing modules generate raster data RD.

Since the positions of the objects in one page are arbitrarily determined, one object is sometimes positioned across two bands. In the foregoing case, the decomposer 140 performs a clip process in band units to generate raster data RD.

Raster data RD generated as described above is temporarily stored in the band buffer 22 so as to be read out in synchronization with the operation of the output device. Thus, raster data RD is printed on a paper sheet.

In the above-mentioned functional structure, the graphics library 110 of the host computer 1 generates print data PD reconstructed in band units. Print data PD is converted into print data PD so as to be transferred to the output apparatus 2. Therefore, the banding process is performed by the host computer 1. Thus, the banding process which has been performed by the decomposer of the output apparatus 2 can be omitted. That is, generation and storage of intermediate format data for one page can be omitted. Thus, raster data RD can directly be written on the band buffer 22. In a case where the object is image data, a memory for storing compressed image data can be omitted. Since deterioration in the image quality occurring owing to compression and expansion of image data does not take place, a high-quality printed image can be provided.

3. Operation

Figure 3:
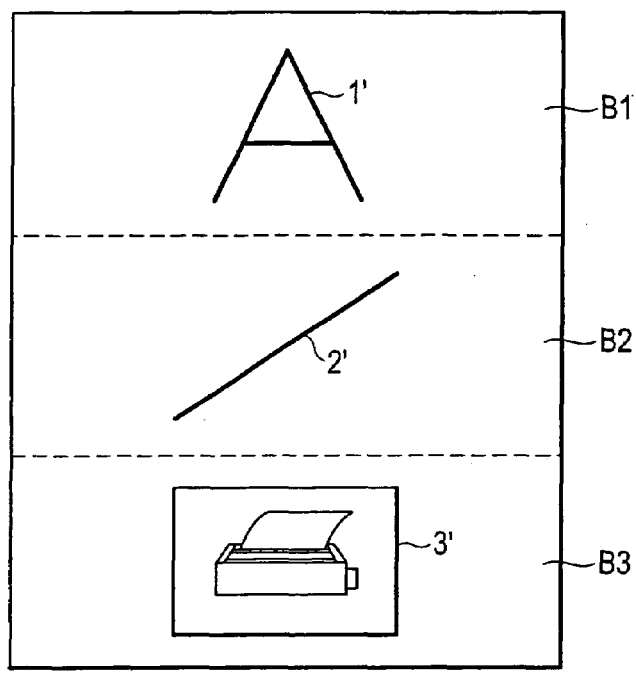
FIG. 3 is a diagram showing an example of an image on one page to describe the operation of the image processing system according to the embodiment.

The operation of the image processing system according to this embodiment will now be described. In this example, an image for one page shown in FIG. 3 is divided into first to third bands B1 to B3 which must be processed.

3-1. Process for Generating Print Data

The applications 100 generate print data PD in the order of describing the objects. In this embodiment, object 1' of a text is disposed in first band B1, object 2' of graphics is disposed in second band B2 and object 3' of an image is disposed in third band B3. An assumption is made here that an image is written in an order as object 1'→object 3'→object 2' and print data corresponding to the objects 1' to 3' are PD1 to PD3. Thus, print data items PD relating to the foregoing page are generated in an order as PD1→PD3→PD2. In the foregoing case, PD1 is expressed as text data, PD2 is expressed as graphics data and PD3 is expressed as image data.

3-2. Banding Process

The graphics library 110 writes, on the metafile 120, print data PD1 to PD3 generated by the applications 100. When the graphics library 110 has been communicated from the applications 100 that print data PD for one page has been generated, the graphics library 110 starts a banding process. The banding process is performed such that the metafile 120 is retrieved to sequentially read print data PD corresponding to the bands in an order as first band B1→second band B2→third band B3. That is, print data PD for one page is reconstructed in band units. As described above, the banding process is performed by the host computer 1 so that the banding process is not required to be performed by the output apparatus 2.

3-3. PDL Data Generating Process

Figure 4:
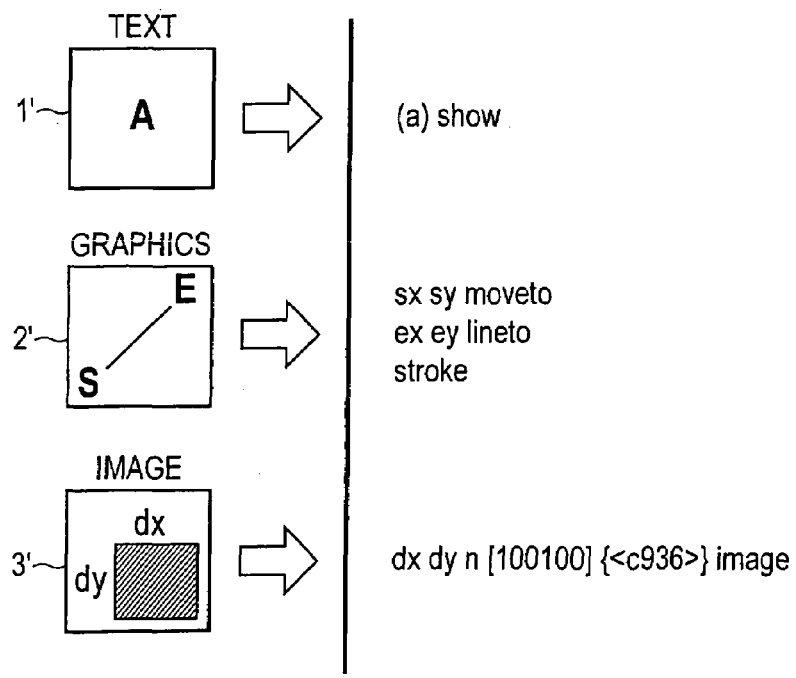
FIG. 4 is a diagram showing a modification of PDL data according to the embodiment.

Then, the printer driver 130 converts print data PD into PDL data PD' in band units. In this embodiment, the conversion process is performed in an order as PD1→PD2→PD3. If PDL data PD' is described by postscript, each PDL data PD' shown in FIG. 4 is generated. If print data PD1 is described in the form of text data as object 1', PDL data PD' composed of parameters which are commands, character strings and matrices is generated. If print data PD2 is described in the form of graphics data as object 2', PDL data PD' composed of parameters which are commands, start and end is generated. If print data PD3 is described in the form of image data as object 3', PDL data PD' composed of parameters which are commands, longitudinal and lateral widths, matrices and identification information of the image is generated.

3-4. Raster Converting Process

When PDL data PD' generated as a result of the banding process has been supplied to the decomposer 140 of the output apparatus 2, the decomposer 140 raster-converts PDL data PD' to generate raster data RD. Since PDL data PD' is supplied in band units in the above-mentioned case, the decomposer 140 is able to directly develop raster data RD in the band buffer 22.

The conventional image processing system has the structure that PDL data PD' is transferred from the host computer 1 in the order of description performed by the applications 100. Therefore, the banding process is performed during the process of the output apparatus 2 to convert PDL data PD' to intermediate format data. Moreover, image data must be stored until the raster development is performed after the banding process has been completed. Therefore, image data must temporarily be compressed and stored. As a result, the memory capacity is enlarged and the image quality deteriorates.

On the other hand, the image processing system according to this embodiment has the structure that the banding process is performed by the host computer 1. The necessity for the output apparatus 2 to generate intermediate format data can be eliminated. The memory for storing compressed image data until the raster development is performed after the banding process has been completed can be omitted. Since the process for compressing and expanding image data can be omitted, a high-quality image can be obtained.

3-5. Printing Process

When raster data RD has been developed in the band buffer 22 by the decomposer 140, raster data RD is read from the band buffer 22 in synchronization with the operation of the output device 24 so as to be printed on a paper sheet.

As described above, the band buffer 22 is composed of the first buffer 221 and the second buffer 222. When raster data RD is being written on either of the buffers, raster data RD is read from another buffer. Thus, writing and reading are alternately repeated. Therefore, if raster data RD relating to first band B1 is written on the first buffer 221, raster data RD relating to second band B2 is written on the second buffer 222. During the foregoing writing period, raster data RD is read from the first buffer 221 so as to be supplied to the output device 24. Simultaneously with writing of raster data RD relating to third band B3 on the first buffer 221, raster data RD relating to second band B2 is read from the second buffer 222. As described above, writing and reading are alternately repeated.

Second Embodiment

The image processing system according to the first embodiment has the structure that print data PD generated by the applications 100 is temporarily stored in the metafile 120 by the graphics library 110. After print data PD for one page has been stored, the graphics library 110 extracts, from the metafile 120, objects which constitute the bands which must be processed. As a result, print data PD reconstructed in band units is generated, and then print data PD is transmitted to the printer driver 130. The foregoing embodiment is structured such that the banding process for reconstructing print data PD for one page in band units is performed by the graphics library 110. Since the applications 100 and the graphics library 110 perform the process in cooperation with each other, the applications 100 are freed up after the banding process which is performed by the graphics library 110 has been completed. Therefore, if the data quantity of print data PD is large, long time is required to complete the banding process. Thus, long time is sometimes required to free the applications 100 up. Therefore, the image processing system according to the second embodiment has the structure that the banding process is performed by the printer driver so as to quickly free up the applications.

Figure 5:
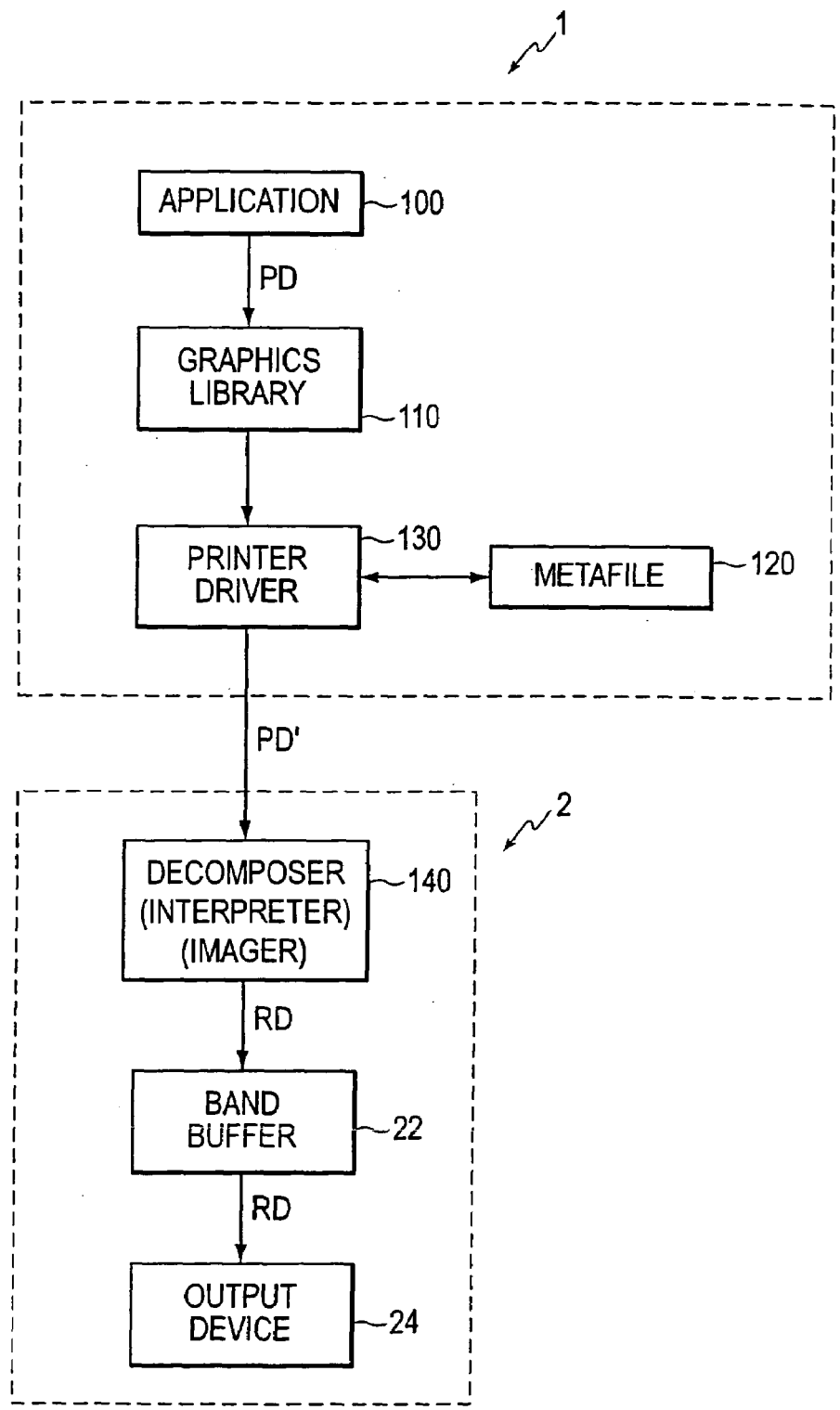
FIG. 5 is a functional block diagram showing an image processing system according to a second embodiment.

The overall structure of the image processing system according to the second embodiment is formed similarly to that of the image processing system according to the first embodiment shown in FIG. 1. FIG. 5 is a block diagram showing the function of the image processing system according to the second embodiment. Referring to FIG. 5, the applications 100 in the host computer 1 generate print data PD in an order of describing the objects positioned at arbitrarily positions in one page, and transfers print data PD to the graphics library 110. Then, the graphics library 110 transfers, to the printer driver 130, print data PD in a transference order from the applications 100. Therefore, the applications 100 are freed up at a moment at which transference of print data PD from the graphics library 110 to the printer driver 130 has been completed. As a result, even if a multiplicity of objects are disposed in one page and long time is required to complete the banding process, the applications 100 can be freed up without a necessity of waiting for the completion of the banding process.

Then, the printer driver 130 stores print data transferred from the graphics library 110 in the metafile 120 in the order of transference from the graphics library 110. After metafile 120 for one page has been generated, the printer driver 130 retrieves the metafile 120 in a predetermined order of the bands so as to extract objects drawn in the foregoing bands from the metafile 120. As described above, print data PD is reconstructed in band units so that the banding process is performed. Print data PD subjected to the banding process is converted into PDL data PD' so as to be transferred to the output apparatus 2. Note that the functional structure of the output apparatus 2 is similar to that according to the first embodiment. Therefore, the output apparatus 2 is omitted from description.

As described above, the second embodiment has the structure that the printer driver 130 generates the metafile 120. Moreover, the banding process is performed in the metafile 120. Therefore, even if a multiplicity of objects are disposed in one page and long time is required to complete the banding process, the applications 100 can quickly be freed up. Therefore, the user is not caused to wait for a long time after the user has input a print command by using the keyboard 13 or the mouse 14. Therefore, the user is able to start a next operation.

Third Embodiment

The image processing system according to the second embodiment has the structure that the graphics library 110 transfers print data PD to the printer driver 130 after the applications 100 have generated print data PD. The graphics library 110 temporarily stores print data PD in the metafile 120. Then, objects which must be drawn in the bands which must be processed are extracted from the metafile 120. Thus, print data PD reconstructed in band units is generated.

The banding process structured as described above is able to as it is process extracted print data PD if one object is included in a certain band. If one object is placed across a plurality of bands, a drawing command relating to the same objects in each band is generated when the conversion to PDL data PD' is performed. If objects are expressed by an image, such as a photograph, and the object is placed across a plurality of bands, image data allowed to overflow the band is wasted. Thus, the efficiency of using the memory deteriorates.

Therefore, this embodiment has the structure that the banding process which is performed by the printer driver 130 is conducted such that objects are divided.

The overall structure of the image processing system according to the third embodiment is similar to that shown in FIG. 1 which is a block diagram showing the image processing system according to the first embodiment. The functional structure of the image processing system according to this embodiment is similar to the functional structure of the image processing system according to the second embodiment shown in FIG. 5. Note that the banding process which is performed by the printer driver 130 is different from that according to the second embodiment in that the objects are subjected to a dividing process. The foregoing process will now be described.

Figure 6:
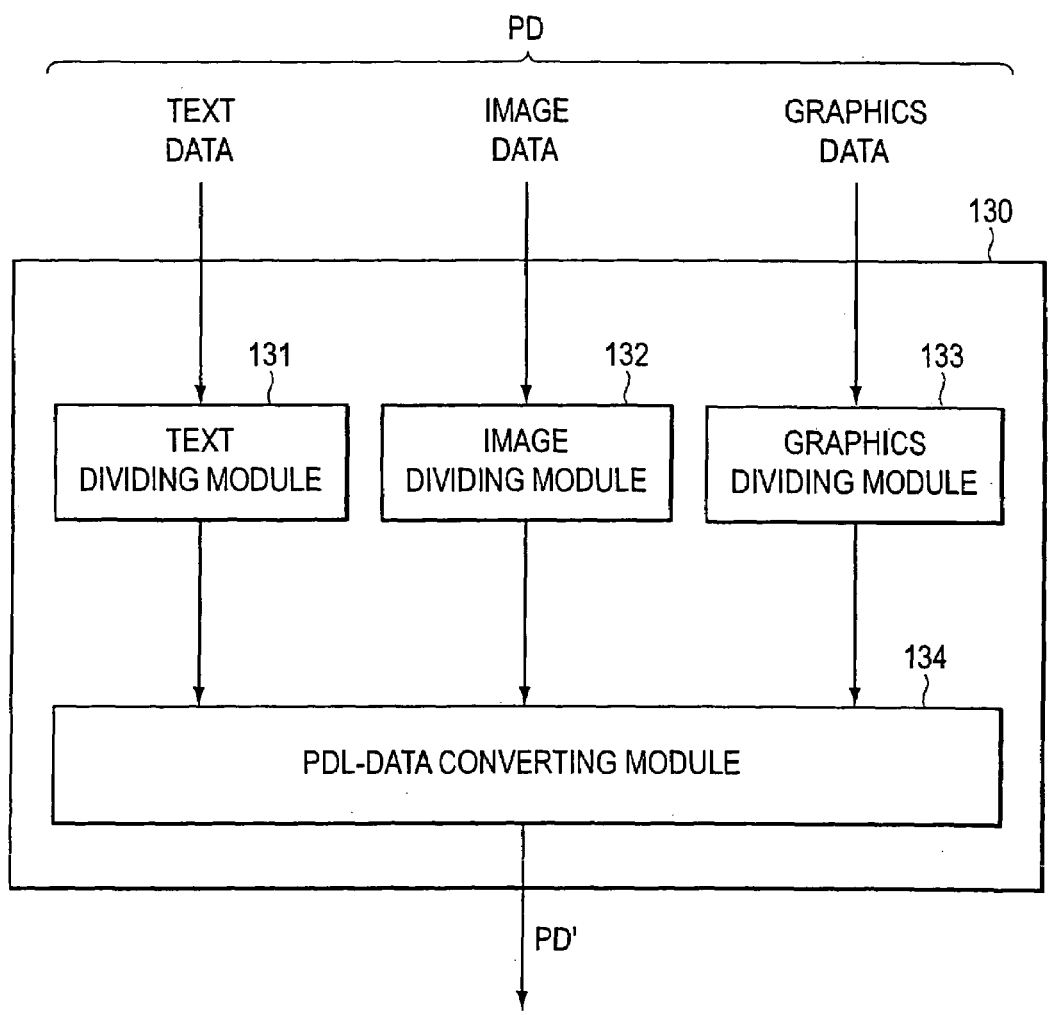
FIG. 6 is a functional block diagram showing a process which is performed by a printer driver according to a third embodiment to divide an object.

FIG. 6 is a functional block diagram showing the process which is performed by the printer driver 130 according to this embodiment to divide objects. Referring to the drawing, the dividing process is performed by a text dividing module 131, an image dividing module 132, a graphics dividing module 133 and a PDL converting module 134. The dividing modules 131 to 133 are selected to be adapted to the type of print data PD. The PDL converting module 134 converts data transmitted from the dividing modules 131 to 133 into PDL data PD'.

Figure 7:
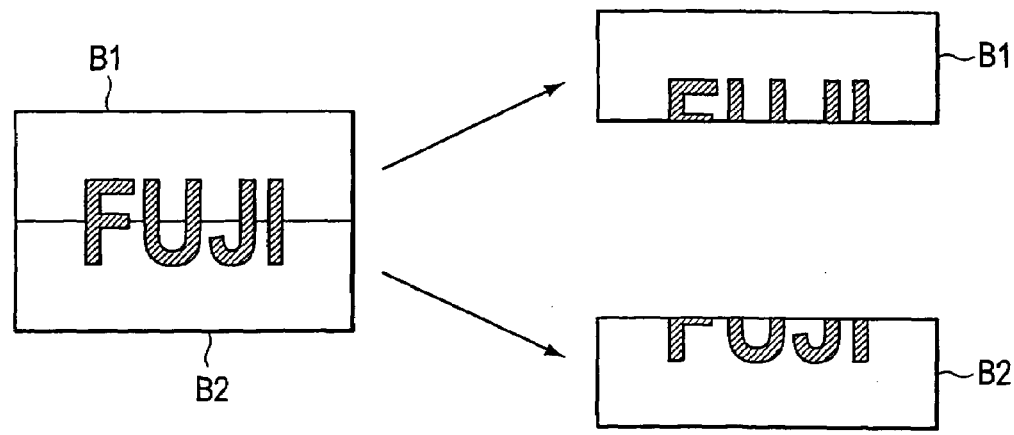
FIG. 7 is a diagram showing a dividing operation which is performed in a text dividing module according to the embodiment when text data is bit map data.

The text dividing module 131 is applied when print data PD is text data. If text data is bit map data, bit map data is divided at a boundary of bands to transmit divided bit map data to the PDL converting module 134 as individual data. If Japanese characters phonetically read as "Fuji" are positioned across first band B1 and second band B2 as shown in FIG. 7, bit map data corresponding to the upper half portion of "Fuji" is transmitted to the PDL converting module 134 when the first band B1 is subjected to the banding process. When the second band B2 is subjected to the banding process, bit map data corresponding to the lower half portion of "Fuji" is transmitted to the PDL converting module 134.

Figure 8:
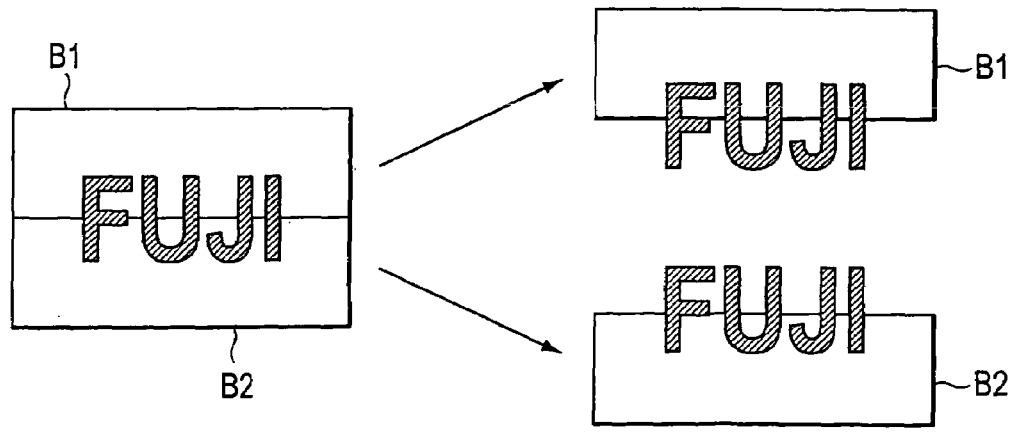
FIG. 8 is a diagram showing a dividing operation which is performed in the text dividing module according to the embodiment when text data is character code data.

If text data is not bit map data, text data is composed of character codes and attribute information indicating the sizes and colors. Therefore, characters positioned across bands cannot be divided at the boundary of the bands differently from bit map data. Therefore, if a character is positioned across a plurality of bands, character codes and attribute information are, therefore, supplied to each band to be adaptable to the dividing process. If characters "Fuji" are positioned across the first band B1 and the second band B2 as shown in FIG. 8, character codes and attribute information are transmitted to the PDL converting module 134 when the first band B1 is processed. Also when the second band B2 is processed, the same character codes and attribute information are transmitted to the PDL converting module 134.

Figure 9:
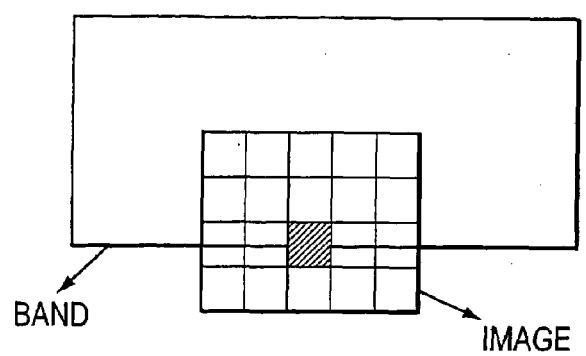
FIG. 9 is a diagram showing a case according to the embodiment where pixels constituting image are positioned across different bands at the boundary of bands.
Figure 10:
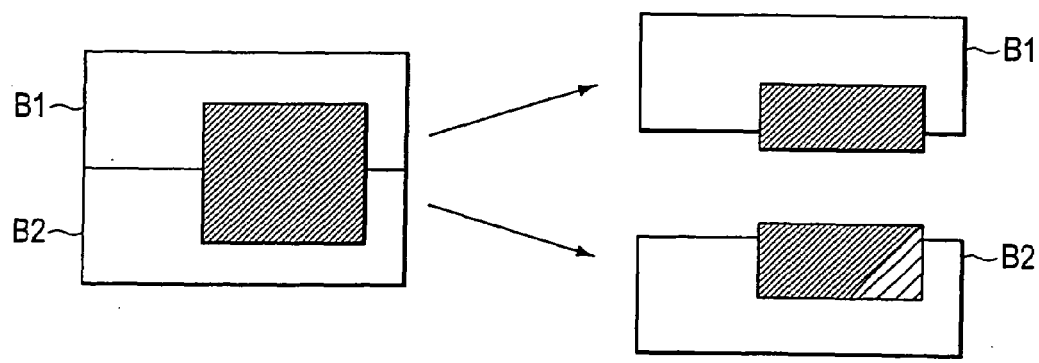
FIG. 10 is a diagram showing an overlap process in an image dividing module according to the embodiment.

The image dividing module 132 is applied when print data PD is image data. The image dividing module 132 divides image data at the boundary of the band. If the resolution of image data is different from that of the output device 24 and the ratio of the resolutions of the two factors is not an integer multiple, pixels constituting image data at the boundary of the bands are positioned across the different bands, as shown in FIG. 9. If the resolution of image data is different from that of the output device 24, the decomposer 140 of the output apparatus 2 converts the resolution by performing interpolation and/or thinning to be adaptable to the resolution of the output device 24. The resolution converting process is performed in accordance with image data of adjacent pixels. Therefore, if image data is simply divided at the boundary of bands, original data for the interpolation process cannot be obtained. In this case, there arises a problem in that pixels in the boundary of bands are drawn white. Therefore, the image dividing module 132 according to this embodiment performs the dividing process such that image data items are caused to overlap each other between two bands, as shown in FIG. 10. Note that ranges of image data which must be caused to overlap each other is set in such a manner that the process of the decomposer 140 to convert the resolution can appropriately be performed.

The graphics dividing module 133 is applied when print data PD is graphics data. The graphics dividing module 133 divides graphics data at the boundary of bands to generate individual graphics data items.

Figure 11:
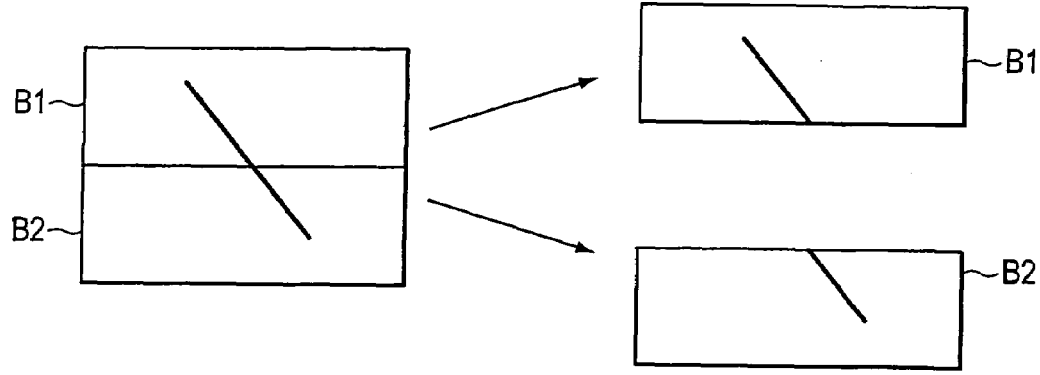
FIG. 11 is a diagram showing a dividing process in a graphics dividing module according to the embodiment when graphic is a straight line having no width.

If the graphic is a straight line having no width, the original straight line is divided at the boundary of the bands, as shown in FIG. 11. In the above-mentioned case, an intersection between the original straight line and the boundary of the bands is made to be a dividing point. Then, the original straight line is divided into a straight line connecting a start of the original straight line and the dividing point to each other and a straight line connecting an end of the original straight line and the dividing point to each other. Each straight line divided as described above is considered as an object drawn in each band. Then, an individual drawing command is issued to each straight line so as to be processed.

Figure 12:
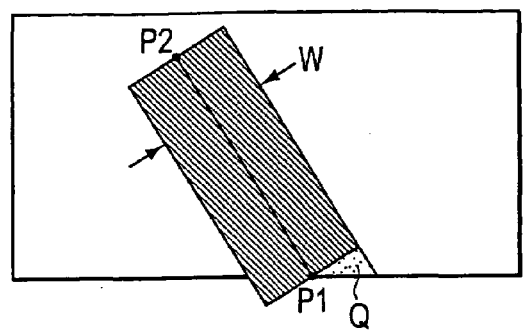
FIG. 12 is a diagram showing a problem occurring when the dividing process which is performed by the graphics dividing module according to the embodiment is carried out when the graphic is a straight line having a width.
Figure 13:
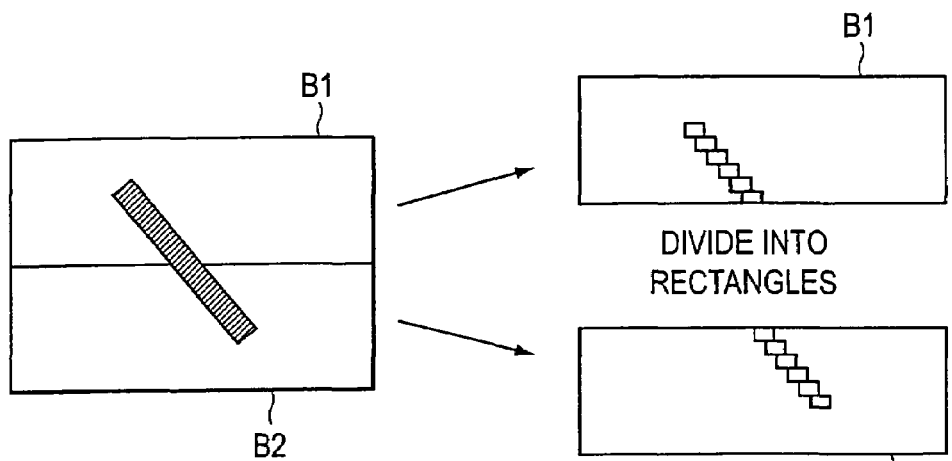
FIG. 13 is a diagram showing a dividing process which is performed by the graphics dividing module according to the embodiment when the graphic is a straight line having a width.

If the graphic is a straight line having width W and a process for the straight line having no width is performed, region Q which is not drawn as shown in FIG. 12 is sometimes caused. Therefore, if the straight line has a width, the straight line is divided into rectangles, as shown in FIG. 13. Then, the straight line is treated as a set of the rectangles. Thus, the straight line is processed as objects for each band.

Figure 14:
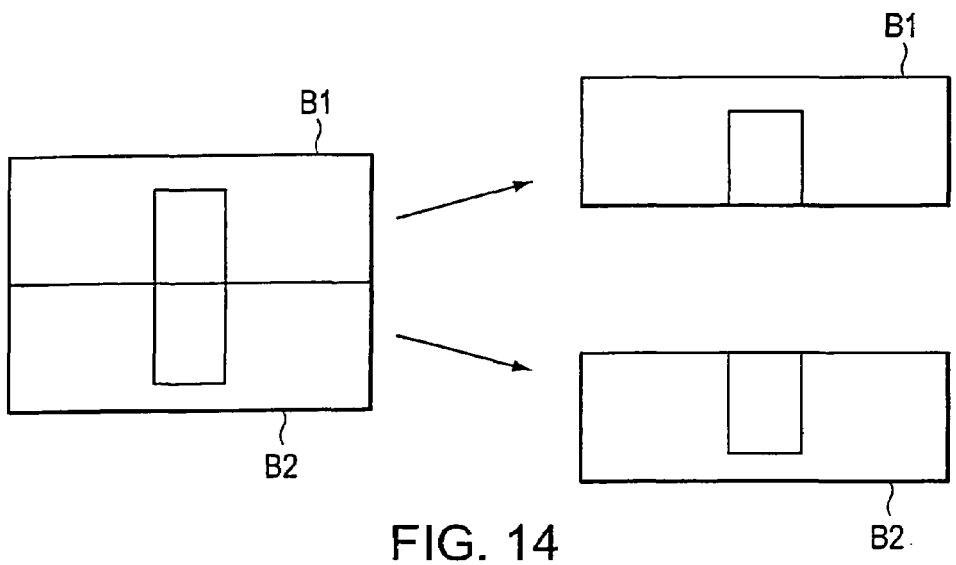
FIG. 14 is a diagram showing a dividing process which is performed by the graphics dividing module according to the embodiment when the graphic is a rectangle.

If the graphic is a rectangle, division into two rectangles is performed at the boundary of bands as shown in FIG. 14 so as to be treated as individual objects. In the foregoing case, individual drawing commands are issued to the inside portion of each band.

Figure 15:
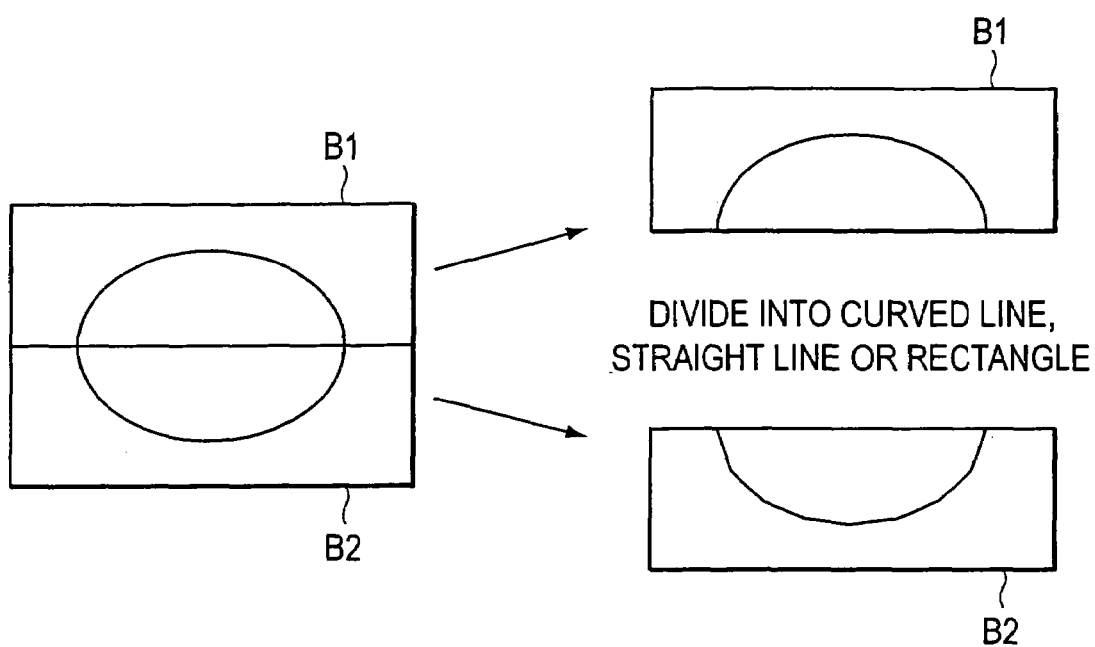
FIG. 15 is a diagram showing a dividing process which is performed by the graphics dividing module according to the embodiment when the graphic is a curved line.

If the graphic is a curved line, division into two curved lines is performed at the boundary of the bands as shown in FIG. 15 so as to be processed as objects in each band. In the foregoing case, parameters, such as a start, an end and a control point, which are provided for the divided curved lines are used to produce data in the bands. When the graphic is a curved line, approximation to the curved line with a straight line may be performed, followed by dividing the straight line. In the foregoing case, a process similar to the process for dividing a straight line is required. If the curved line has a width, the curved line is treated as a set of rectangles similarly to the case where the straight line has a width so that whitening is prevented.

The operation to be performed until print data PD generated by the applications 100 is converted into PDL data PD' in band units will now be described with reference to FIG. 16. Note that straight line L connecting start s and end e to each other is drawn across first band B1 and second band B2.

When print data PD for instructing drawing of straight line L is produced by the applications 100, print data PD is transferred to the printer driver 130 through the graphics library 110. Thus, the printer driver 130 stores print data PD in the metafile 120, as shown in FIG. 16.

Then, objects included in the bands which must be processed are extracted from the metafile 120 when the printer driver 130 performs the banding process. If the first band B1 is a band which must be processed, print data PD stored in the metafile 120 is extracted as an object. If the printer driver 120 has detected that print data PD instructs drawing of graphics and the object is positioned across the first band B1 and the second band B2, the printer driver 120 transfers print data PD to the graphics dividing module 133.

Then, the graphics dividing module 133 detects the intersection between the straight line L and the boundary of the bands so as to divide the straight line L into straight line L1 and straight line L2. Specifically, as shown in FIG. 16, division is performed into straight line L1, which has start s1 which is start s of the original line L and a dividing point which is end e, and the straight line L2 which has end e2 which is end e of the original straight line L and start s2 which is the dividing point. That is, an object positioned across a plurality of bands is divided into an object in each band. Then, print data PD1 for instructing drawing of the straight line L1 and print data PD2 for instructing drawing of the straight line L2 are produced. The generated print data PD1 and PD2 are transmitted to the PDL converting module 134.

Figure 16:
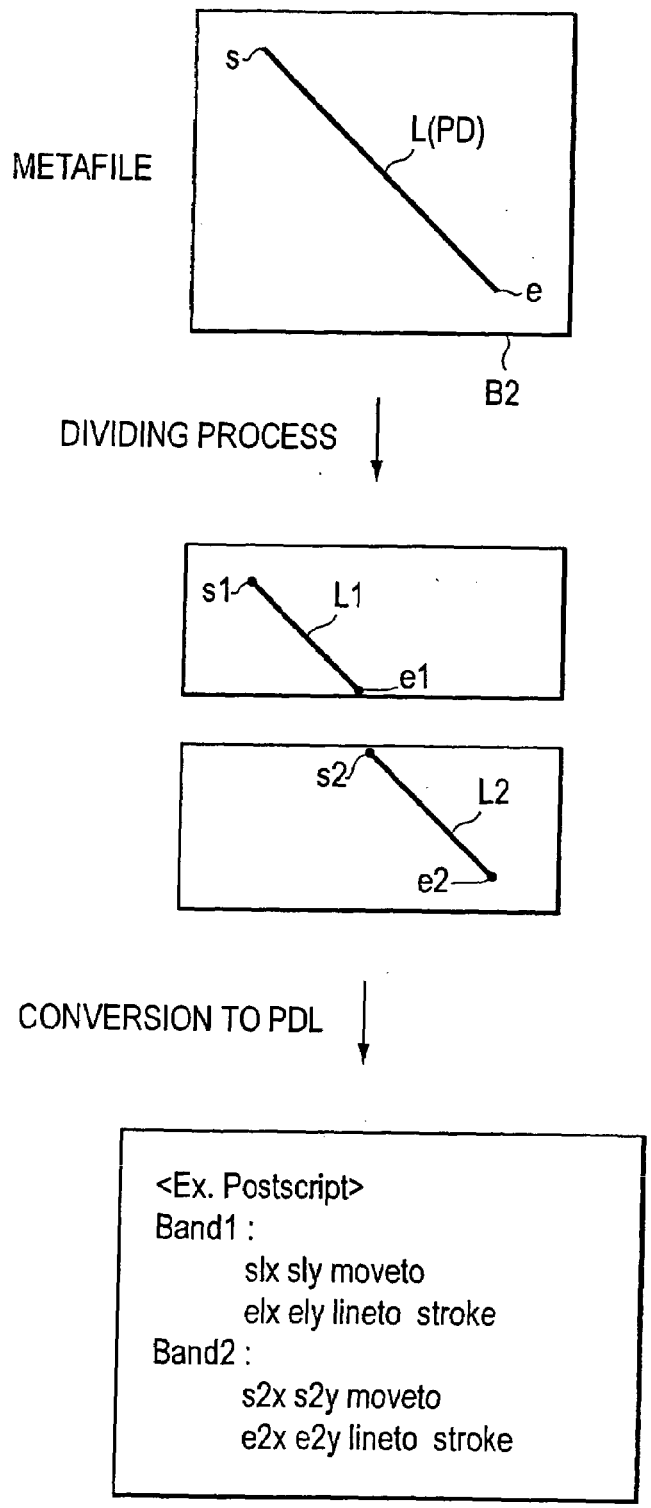
FIG. 16 is a diagram showing the operation in the image processing system according to the embodiment when print data generated by applications is converted into PDL data in band units.

Then, the PDL converting module 134 generates and transmits PDL data PD' of "Band1" shown in the lower portion in FIG. 16 when the PDL converting module 134 processes the first band B1. The PDL converting module 134 generates PDL data PD' of "Band2" when the PDL converting module 134 processes the second band B2. Thus, PDL data PD' subjected to the banding process is supplied. Thus, similarly to the first and second embodiments, PDL data PD' is converted into raster data RD by the decomposer 140 so as to directly be developed in the band buffer 22. In synchronization with the operation of the output device 24, raster data RD is read so that an image is printed on a paper sheet.

As described above, the image processing system according to the third embodiment has the structure that the printer driver 130 of the host computer 1 performs the banding process while performing the process for dividing the objects. Therefore, even if an object is positioned across bands, the process can appropriately be performed.

When image data is divided, an object which must be transmitted to two band is divided while the object is being allowed to overlap each other. Therefore, even if the resolution of image data and that of the output device 24 are different from each other, whitening can be prevented.

Fourth Embodiment

The image processing system according to the third embodiment has the structure that the printer driver 130 performs the banding process and the process for dividing an object. On the other hand, an image processing system according to a fourth embodiment has a structure that the graphics library 110 performs the banding process and the process for dividing an object.

The overall structure and the functional structure of the image processing system according to the fourth embodiment are similar to the image processing system according to the first embodiment shown in FIGS. 1 and 2 except for the function of the graphics library 110. The graphics library 110 according to the fourth embodiment stores, in the metafile 120, print data PD transferred from the applications 100. After the graphics library 110 has stored print data for one page in the metafile 120, the graphics library 110 performs the banding process for reconstructing print data for each band. At this time, the graphics library 110 determines whether or not the object is positioned across a plurality of bands. If the object is included in one band, the graphics library 110 transmits, to the printer driver 130, print data PD corresponding to the object. If the object is positioned across a plurality of bands, the graphics library 110 performs a dividing process similar to that according to the third embodiment in accordance with the type of the object, for example, a text, an image or graphics. Thus, the graphics library 110 produces print data PD divided in band units so as to transmit print data PD to the printer driver 130.

The printer driver 130 converts print data PD into PDL data PD' in the page description language form so as to transmit PDL data PD' to the output apparatus 2. Similarly to the first embodiment, the output apparatus 2 interprets PDL data PD' to print an image on a paper sheet by using the output device 24.

As described above, the fourth embodiment has the structure that the host computer 1 performs the banding process while performing the process for dividing an object similarly to the third embodiment. Therefore, even if an object is positioned across bands, the process can appropriately be performed.

However, the third embodiment having the structure that the printer driver 130 performs the process for dividing an object and the banding process shortens time for which the graphics library 110 occupies the applications 100. Thus, the applications 100 can quickly be freed up.

Fifth Embodiment

The image processing system according to the third embodiment has the structure that the printer driver 130 performs the band and the process for dividing an object. Therefore, if image data having a large data quantity is positioned across a plurality of bands, image data having the large quantity must be processed whenever the dividing process is performed for each band. Therefore, print data, such as the same image data or graphics data, is repeatedly processed in each of bands across which an object is positioned. That is, the region of an object, which overflows a band which is being processed, is processed plural times. Thus, processing time and memory are wasted. The fifth embodiment is structured in view of the foregoing. A result of the dividing process is stored so that a dividing process which overlaps in each band is omitted. Thus, an object of this embodiment is to shorten processing time and improve the efficiency of using the memory.

The overall structure of an image processing system according to the fifth embodiment is similar to that of the image processing system according to the first embodiment shown in FIG. 1 which is a block diagram. The functional structure of the image processing system according to this embodiment is similar to that of the image processing system according to the first embodiment shown in FIG. 2 except for the functional structure of the printer driver 130. That is, a similar process to that of the first embodiment is performed in which print data PD for one page generated by the applications 100 is stored in the metafile 120 through the graphics library 110, after which print data PD reconstructed in band units is transmitted by the graphics library 110 to the printer driver 130. In the foregoing case, print data PD is provided with a tag in order to identify the object.

Figure 17:
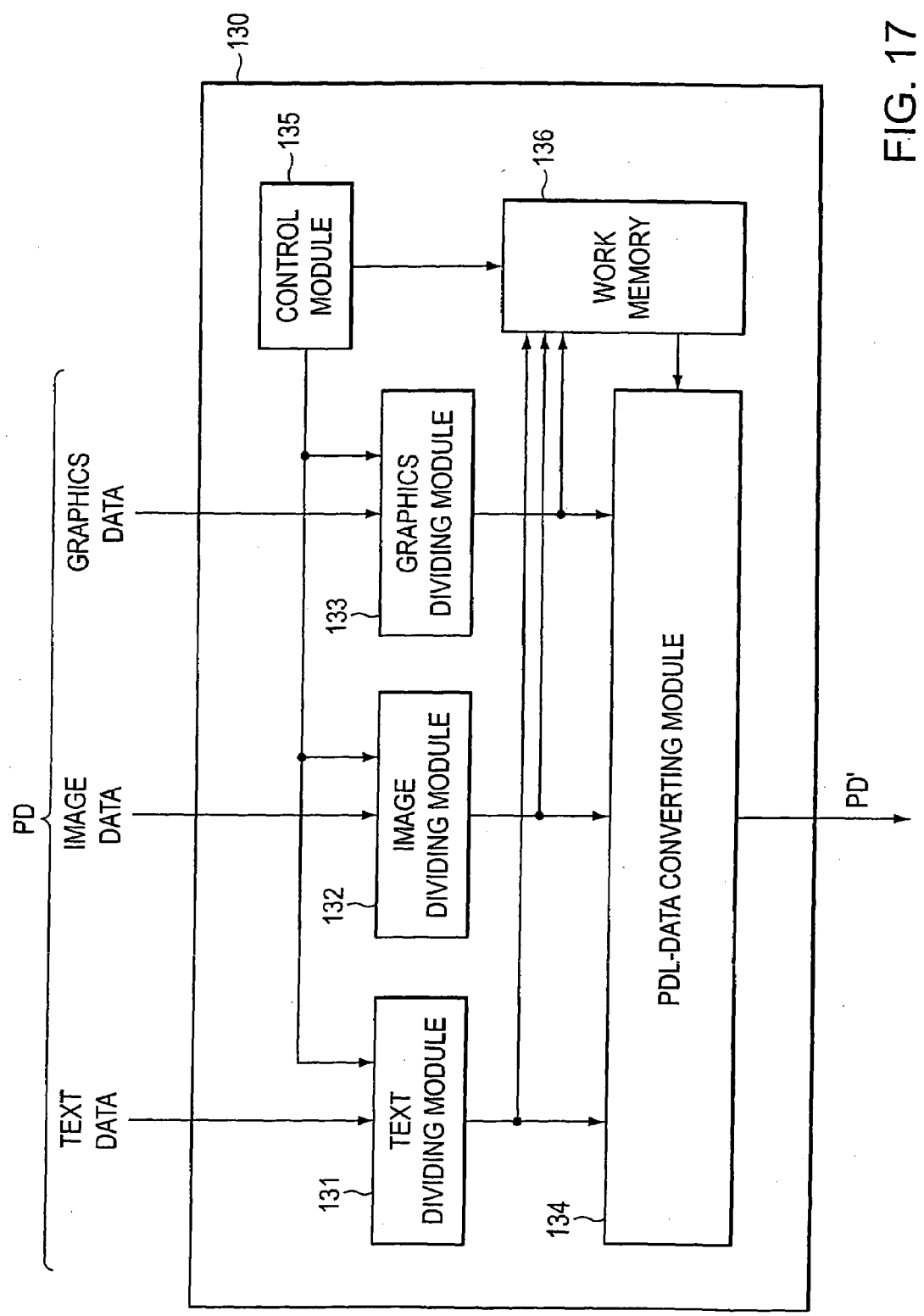
FIG. 17 is a functional diagram showing a process for dividing an object which is performed by a printer driver according to a fifth embodiment.

FIG. 17 is a functional block diagram showing a process which is performed by the printer driver 130 according to this embodiment to divide an object. Referring to the drawing, the text dividing module 131, the image dividing module 132 and the graphics dividing module 133 are structured similarly to those of the third embodiment. An output buffer is subjected to a dividing process in accordance with the type of print data PD which is a text, an image or graphics.

When the printer driver 130 processes a certain band and objects positioned across the foregoing band and another band are subjected to a dividing process, each of the dividing modules 131 to 133 divides the objects into objects which are drawn in the foregoing band and objects which are drawn in the other bands. Then, the printer driver 130 generates print data PD for both of the divided objects. The dividing modules 131 to 133 store print data PD relating to the foregoing band in the PDL converting module 134 and stores print data PD relating to the other bands in the work memory 136.

In the foregoing case, a tag indicating the type of the original object, information for identifying the band in which the divided object must be drawn and print data indicating the contents of the divided object forming a set is stored in the work memory 136. Therefore, when the work memory 136 is retrieved in accordance with the tag and information for identifying the band, whether or not divided print data PD has been produced can be detected.

When the control module 135 is supplied with print data PD from the graphics library 110, the control module 135 retrieves the work memory 136 by using the tag provided for print data PD and identification information instructing the band which is being processed. If corresponding print data PD exists, the control module 135 transmits corresponding print data PD to the PDL converting module 134 so as to generate PDL data PD'. Therefore, when a process for dividing a certain object is performed once, the necessity of dividing the same object can be eliminated.

If corresponding print data PD does not exist in the work memory 136 as a result of the retrieval of the work memory 136, the control module 135 determines whether or not an object indicated by print data PD supplied from the graphics library 110 is positioned across a plurality of bands. If a determination is made that the object is positioned across a plurality of bands, a dividing process in accordance with the type of print data PD is performed by each of the dividing modules 131 to 133. If a determination is made that the object is not positioned across a plurality of bands, print data PD is directly supplied to the PDL converting module 134 so that PDL data PD' is generated.

When PDL data PD' generated by the printer driver 130 has been supplied to the output apparatus 2, the output apparatus 2 interprets PDL data PD' similarly to the first embodiment so as to print an image on a paper sheet by using the output device 24.

As described above, the fifth embodiment has the structure that a result of the dividing process is stored in the work memory 136. Therefore, a certain object is not subjected to the dividing process several times. As a result, any dividing process overlapping in each band can be eliminated. Thus, processing time can be shortened and the efficiency of using the memory can be improved.

(Modification)

The embodiments according to the present invention have been described. Note that the present invention is not limited to the above-mentioned embodiments. A variety of the following modifications may be employed.

(1) In each of the above-mentioned embodiments, the banding process is performed by the host computer 1. In this case, the metafile 120 for one page must be provided for the host computer 1. Therefore, if image data having a large data quantity is included in a certain page, a large memory region is used to serve as the metafile 120. Since also the process for dividing an object is performed by the host computer, a working efficiency of another application deteriorates in the host computer 1 if the memory capacity of the host computer 1 is not satisfactorily large or if the operation speed of the CPU 10 is not sufficiently high.

If the performance of the host computer 1 is unsatisfactory, a structure may be employed in which the foregoing fact is detected and the banding process is performed by the output apparatus 2. Specifically, a file on which the type (version information) of the CPU 10 and the capacity of an available memory have been described is prepared. The printer driver 130 makes a reference to the foregoing file to detect the performance of the host computer 1. In accordance with a result of the detection, whether the host computer 1 performs the banding process or the output apparatus 2 performs the banding process may be determined. If the banding process is not performed by the host computer 1, the printer driver 130 converts print data PD into PDL data PD' so as to transfer PDL data PD' to the output apparatus 2. Thus, the banding process is performed by the output apparatus 2.

In the above-mentioned case, a reference to version information of the output apparatus 2 may be made to subject the processing performance of the host computer 1 and that of the output apparatus 2 to a comparison by the printer driver 130 so as to determine an apparatus which performs the banding process.

As described above, the mechanism is provided which is capable of selecting the apparatus which performs the banding process in accordance with the performance of the host computer 1. In a case where the host computer has not satisfactory performance, the banding process can be performed by the output apparatus 2.

(2) In each of the above-mentioned embodiments, the band for dividing one page into a plurality of regions has been described about a band which divides the page in the sub-scanning direction of the output device 24. The present invention is not limited to this. The band of a type which divides the page in the main scanning direction and the sub-scanning direction may be employed. In an example output apparatus 2 having a portrait direction tray for accommodating A4S-size paper sheets and a landscape direction tray for accommodating A4L-size paper sheets, if the tray runs out paper during an operation for printing A4S-size paper sheets, the image is rotated by 90°. Thus, change to A4L-size paper sheet is permitted to continue the printing operation. In the foregoing case, it is preferable that the size is employed which corresponds to the length of the band or the size is in the form of a square having a size which is a factor of an integer.

Figure 18:
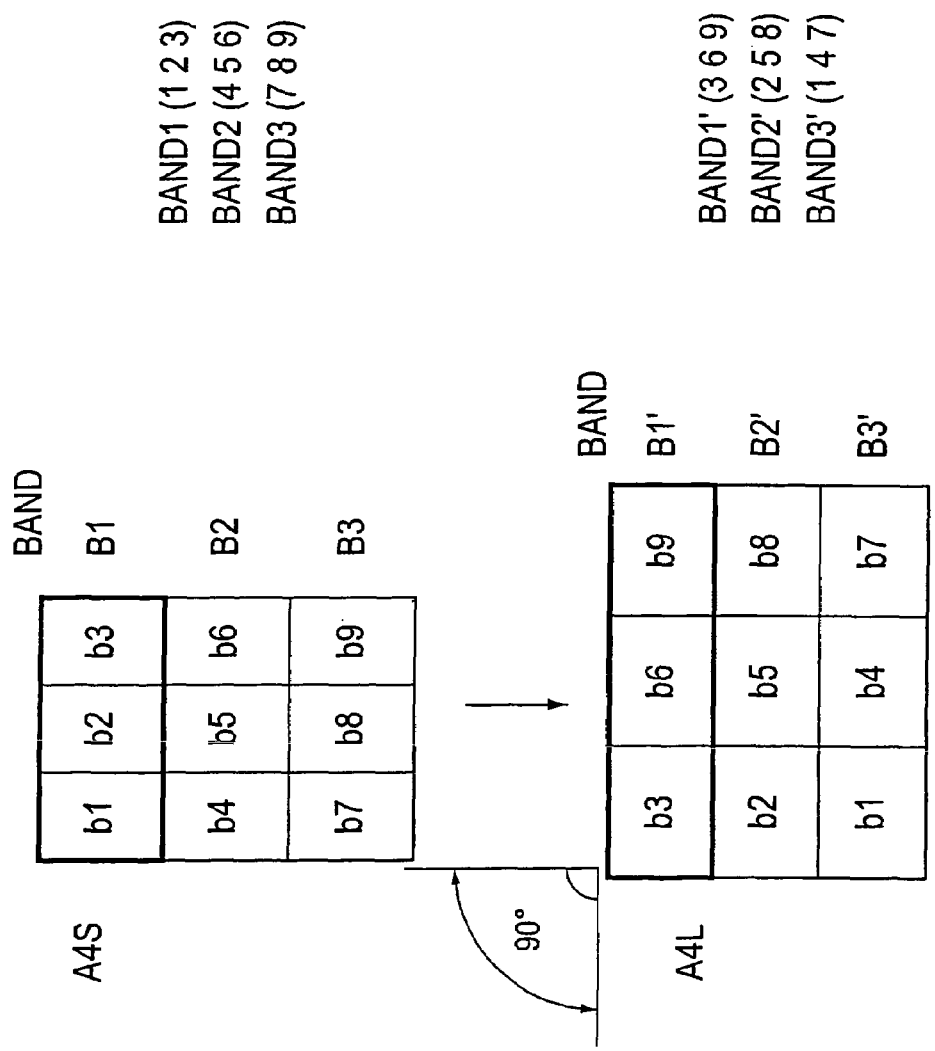
FIG. 18 is a diagram showing an example of a rotating process according to a modification to continue the operation even if running out of paper takes place.

FIG. 18 is a diagram showing a rotating process which is performed in a case of running out of a paper sheet. In this case, three bands B1 to B3 formed by dividing A4S-size paper sheet in the sub-scanning direction are created. Moreover, the three bands B1 to B3 are divided into three sections in the main scanning direction. Thus, the three bands B1 to B3 are finely divided into bands b1 to b9. Moreover, PDL data PD' is formed for each of the bands b1 to b9. In the foregoing case, when an A4S-size paper sheet is instructed to be printed, the output apparatus 2 generates raster data RD of the band B1 in accordance with PDL data PD' relating to the bands b1 to b3. Then, the output apparatus 2 develops the raster data RD in the band buffer 22. Then, the output apparatus 2 performs the process in an order as the band B2 and the band B3.

If the tray runs out the A4S-size paper sheet and the A4L-size paper sheets are accommodated in the landscape direction tray, a sensor for detecting running out of paper provided for the output apparatus 2 detects a fact that the portrait direction tray runs out paper. Thus, the CPU 20 detects a detection signal supplied from the sensor to switch the tray to the portrait direction tray. In the foregoing case, PDL data PD' of the bands b3, b6 and b9 is rotated by 90° so as to reconstruct band B1'. Similarly, bands B2' and B3' can be reconstructed. As a result, the printing operation can be continued even if the tray runs out paper.

(3) In each of the foregoing embodiments, the host computer 1 performs the banding process to generate reconstructed PDL data PD' for each band. The apparatus for generating PDL data PD' is not limited to a general-purpose computer. The apparatus may be an apparatus for only processing an image. Moreover, the applications 100 are permitted to be omitted from the apparatus. Any image processing apparatus may be employed if the apparatus is able to reconstruct print data in band units and convert reconstructed print data PD into PDL data PD'.

(4) Each of the above-mentioned embodiments has the structure that the graphics library 110, the metafile 120 and the metafile 120 reconstruct print data PD' in band units. In accordance with reconstructed print data PD, PDL data PD' is generated. The present invention is not limited to the foregoing structure. Any structure may be employed if the structure has the function for reconstructing PDL data PD' in band units and the function for converting reconstructed data into PDL data PD'.

(5) The foregoing third embodiment has the structure that a straight line or the like having a width is divided into rectangles to divide the object in band units. The present invention is not limited to the rectangle. Any structure may be employed if the structure is arranged such that an object is divided into drawing primitives which are elements for drawing an image. Moreover, the object is treated as a set of the drawing primitives. The drawing primitives are used to divide the object at the boundary of the bands.

As described above, the specified structure of the present invention is formed such that the image processing apparatus generates PDL data for each band. Therefore, the banding process which is performed by the output apparatus can be omitted. Thus, the load which must be borne by the output apparatus can be reduced. In particular, the necessity for the output apparatus to generate intermediate format data can be eliminated. Moreover, the memory for converting image data into an intermediate code can be omitted. Thus, the memory can considerably be reduced. Since the necessity of compressing and expanding image data can be eliminated, deterioration in the image quality can be prevented in principle. As a result, a high-quality image can be printed.

Since an object is divided when print data is reconstructed in band units, the processing time can be shortened and the memory can effectively be used.

Since the band obtained by dividing in the main and sub-scanning directions is used, reconstruction of the band permits the apparatus to be operated continuously even if a tray runs out of paper.

What is claimed is:

1. An image processing apparatus, comprising:
   reconstructing means for dividing, in band units, print data that indicates contents of objects positioned in one pare which is composed of a plurality of the bands and reconstructing print data in the band units,
   converting means for converting the data reconstructed by said reconstructing means into page description language data that is in a page description language form, and
   transmitting means for transmitting the page description language data,
   wherein the reconstructing means processes and distinguishes print data according to a type of the print data, and decides whether the band units to be reconstructed have common data.

2. The image processing apparatus according to claim 1, wherein said reconstructing means includes:
   storage means for storing print data for one page; and
   a graphic library for generating data reconstructed in the band units by retrieving the contents stored in said storage means,
   wherein said converging means is a printer driver for converting data supplied in the band units from said graphic library into the page description language data.

3. The image processing apparatus according to claim 1, wherein said reconstructing means and said converting means include:
   a printer driver; and
   storage means, and said printer driver stores print data supplied from said graphics library in said storage means, and retrieves said storage means after print data for one page has been stored in said storage means so that data reconstructed in the band units is read from said storage means, and read data is converted into the PDL data.

4. The image processing apparatus according to claim 1, wherein
   said reconstructing means divides said objects across plural bands in band units to generate data reconstructed in the band units.

5. The image processing apparatus according to claim 4, wherein
   said reconstructing means divides bit map data at boundaries among the bands, when the objects across plural bands are divided for each band in a case where print data is bit map data.

6. The image processing apparatus according to claim 4, wherein
   said reconstructing means transmits text data for each of corresponding bands, when the objects across the plural bands are divided for each band in a case where print data is text data which instructs a character code.

7. The image processing apparatus according to claim 4, wherein
   said reconstructing means divides image data such that divided objects overlap one another, when the objects across the plural bands are divided for each band in a case where print data is image data.

8. The image processing apparatus according to claim 4, wherein
   said reconstructing means divides the objects into draw primitives, and handles sets of the draw primitives belonging to the bands as objects for each band so that the objects across the plural bands are divided for each band.

9. The image processing apparatus according to claim 4, wherein
   said reconstructing means makes approximation to curves with a plurality of straight lines, when print data is graphics data indicating the curves so as to divide the curves across the plural bands for each band.

10. The image processing apparatus according to claim 1, wherein said reconstructing means includes:
    detecting means for detecting processing performance of said image processing apparatus; and
    determining means for determining whether or not print data is reconstructed, and wherein print data is transmitted to said converting means, when said determining means has determined that reconstruction is not performed.

11. The image processing apparatus according to claim 1, wherein
    said band is obtained by dividing a page in a main scanning direction and a sub-scanning direction.

12. An image processing system, comprising:
    an image processing apparatus including:
      reconstructing means for dividing, in band units, print data that indicates contents of objects positioned in one page which is composed of a plurality of the bands and reconstructing print data in the band units,
      converting means for converting the data reconstructed by said reconstructing means into page description language data that is in a page description language form, and
      transmitting means for transmitting the page description language data,
      wherein the reconstructing means processes and distinguishes print data according to a type of the print data, and decides whether the band units to be reconstructed have common data; and
    an output apparatus including:
      receiving means for receiving the page description language data,
      raster converting means for converting the page description language data received by said receiving means into raster data,
      a buffer for storing, in the band units, the raster data converted by said raster converting means, and
      a printing mechanism for printing the objects on a printing sheet in accordance with the raster data read from said buffer.

13. An image processing method for an image processing system including an image processing apparatus and an output apparatus, comprising:
    dividing, in band units, print data that indicates contents of objects positioned in one page which is composed of a plurality of the bands;
    reconstructing the print data in the band units and distinguishing according to a type of the print data, and deciding whether the band units to be reconstructed have common data;
    converting reconstructed data into page description language data in a page description language form;
    converting the page description language data into raster data;
    storing, in the band units, the converted raster data; and
    printing the objects on a printing sheet in accordance with the stored raster data.

14. An image processing apparatus, comprising:
reconstructing means for dividing, in band units, print data that indicates contents of objects positioned in one page which is composed of a plurality of the bands and reconstructing print data in the band units,
converting means for converting the data reconstructed by said reconstructing means into page description language that is in a page description language form; and
transmitting means for transmitting the page description language data;
wherein the reconstructing means processes and distinguishes print data according to a type of print data and determines whether the objects are positioned across a plurality of the band units.

* * * * *